United States Patent [19]

Matsumoto

[11] Patent Number: 4,936,404
[45] Date of Patent: Jun. 26, 1990

[54] VEHICLE TRACTION CONTROL SYSTEM PROVIDING TWO OR MORE DIFFERENT DRIVE MODES AT THE DRIVER'S OPTION

[75] Inventor: Renpei Matsumoto, Tokyo, Japan

[73] Assignee: Fuji Jukogyo Kabushiki Kaisha, Tokyo, Japan

[21] Appl. No.: 280,438

[22] Filed: Dec. 6, 1988

[30] Foreign Application Priority Data

Dec. 22, 1987 [JP] Japan .................. 62-326082

[51] Int. Cl.$^5$ .......................... B60L 3/10; B60T 8/32
[52] U.S. Cl. .................................. 180/197; 303/96; 364/426.02
[58] Field of Search .................. 180/197; 303/96, 109, 303/100; 364/426.02, 426.03

[56] References Cited

U.S. PATENT DOCUMENTS

| | | | |
|---|---|---|---|
| 3,934,938 | 1/1976 | Kuwana et al. | 364/426.02 |
| 4,344,139 | 8/1982 | Miller et al. | 180/197 X |
| 4,419,654 | 12/1983 | Funk | 180/197 |
| 4,733,760 | 3/1988 | Inagaki et al. | 180/197 X |
| 4,759,589 | 7/1988 | Leiber | 303/109 X |

Primary Examiner—Mitchell J. Hill
Attorney, Agent, or Firm—Beveridge, DeGrandi & Weilacher

[57] ABSTRACT

A wheel slip responsive traction control system particularly well suited for use with a four wheel drive vehicle having a hydraulic brake control mechanism for individually controlling a fluid pressure acting on a brake on each drive wheel. The traction control system includes a drive mode selector which offers to the vehicle driver a choice among a "normal drive" mode, a "front drive" mode and a "rear drive" mode. When the driver chooses the "normal drive" mode, the control system controls the brakes on both front and rear pairs of drive wheels so as to maintain their slip rates at less than a relatively low first limit. When the "front drive" mode is chosen, the front pair of drive wheels are so braked as to maintain their slip rate at less than a second limit higher than the first limit. When the "rear drive" mode is chosen, the brakes on the rear pair of drive wheels are so controlled as to maintain the rear wheel slip rate at less than the second limit.

3 Claims, 2 Drawing Sheets

VEHICLE TRACTION CONTROL SYSTEM PROVIDING TWO OR MORE DIFFERENT DRIVE MODES AT THE DRIVER'S OPTION

BACKGROUND OF THE INVENTION

This invention relates to traction control systems for motor vehicles for automatically braking the vehicle wheels so as to prevent wheelspin. More specifically, the invention pertains to a wheel slip responsive traction control system offering a choice between two or more different drive modes. The traction control system of the invention finds a typical application to a four wheel drive vehicle, making it possible to drive the vehicle in either a "normal drive" mode, a "front drive" mode or a "rear drive" mode.

Vehicle traction control in response to the rate of wheel slip is per se not new in the art. Generally, in this type of traction control system, vehicle traction is so controlled as to limit the slip of the drive wheels at a rate (S1 in FIG. 3 of the drawings attached hereto) where the driving force and lateral force of the vehicle are equally high. Wheelspin is thus prevented by assuring the high lateral force without substantially sacrificing the driving force at driving on cornering.

Traction control by the above discussed conventional method enhances vehicle stability but diminishes maneuverability as a sporty like, for the lateral force greatly affects steerability. Take a four wheel drive vehicle for example. The vehicle will gain in maneuverability, behaving like a rear drive vehicle, if the lateral force of the rear pair of drive wheels is lessened. If the lateral force of the front pair of drive wheels is decreased, on the other hand, then the vehicle will gain in stability and behave like a front drive vehicle. As far as the applicant is aware, there has been suggested no system that realizes selective traction control in either of such different drive modes.

U.S. Pat. No. 3,893,535 and Japanese Patent Laid-Open Publication No. 62-87630 represent examples of prior art traction control systems. The cited prior art systems are similar in that, upon detection of wheelspin, the engine output torque is automatically decreased to overcome the wheelspin. Traction control through changes in engine output torque is objectionable because it is incapable of independent control of the front and rear pairs of wheels. The provision of two or more different drive modes necessitates the independent traction control of the two pairs of wheels.

SUMMARY OF THE INVENTION

The present invention realizes independent traction control of the front and rear pairs of vehicle wheels and, in consequence, the provision of a plurality of different drive modes at the vehicle driver's option.

Briefly, the invention may be summarized as a wheel slip responsive traction control system for a motor vehicle of the type having front and rear pairs of wheels, a set of brakes provided one on each wheel of the vehicle, and brake control means for individually controlling the braking forces applied by the brakes to the front and rear pairs of wheels. The traction control system comprises a drive mode selector for selecting either of at least first and second different drive modes, slip detector means for detecting the actual slip rates of the front and rear pairs of wheels, and desired slip rate setting means connected to the drive mode selector for controllably varying the permissible slip rates of the front and rear pairs of wheels depending upon which of the first and second drive modes is selected. Also included are slip control means connected to both the slip detector means and the desired slip rate setting means for causing, when the first drive mode is selected, the brake control means to control the braking forces applied to both front and rear pairs of wheels so as to maintain the actual slip rates thereof at not more than a first permissible slip rate, and for causing, when the second drive mode is selected, the brake control means to control the braking forces applied to either of the front and rear pairs of wheels so as to maintain the actual slip rate thereof at not more than a second permissible slip rate.

In a preferred embodiment disclosed herein, in which the traction control system is adapted for a four wheel drive vehicle, the drive mode selector offers a choice among a "normal drive" mode, a "front drive" mode and a "rear drive" mode. When the driver chooses the "normal drive" mode, the control system controls the brakes on both front and rear pairs of drive wheels so as to maintain their slip rates at less than a relatively low first limit. When the "front drive" mode is chosen, the front pair of drive wheels are so braked as to maintain their slip rate at less than a second limit higher than the first limit. When the "rear drive" mode is chosen, the brakes on the rear pair of drive wheels are so controlled as to maintain the rear wheel slip rate at less than the second limit.

Thus, the invention provides a novel traction control system whereby the vehicle may be driven in either of the three different modes in consideration of stability, maneuverability, and other factors of vehicle behavior. The vehicle can be conditioned for any of such different drive modes through simple alteration of the permissible slip rates of the front and rear pairs of wheels.

The above and other features and advantages of the invention and the manner of realizing them will become more apparent, and the invention itself will best be understood, from a study of the following description and appended claims, with reference had to the attached drawings showing the preferred embodiment of the invention.

DESCRIPTION OF THE PREFERRED EMBODIMENT

Figure 1:
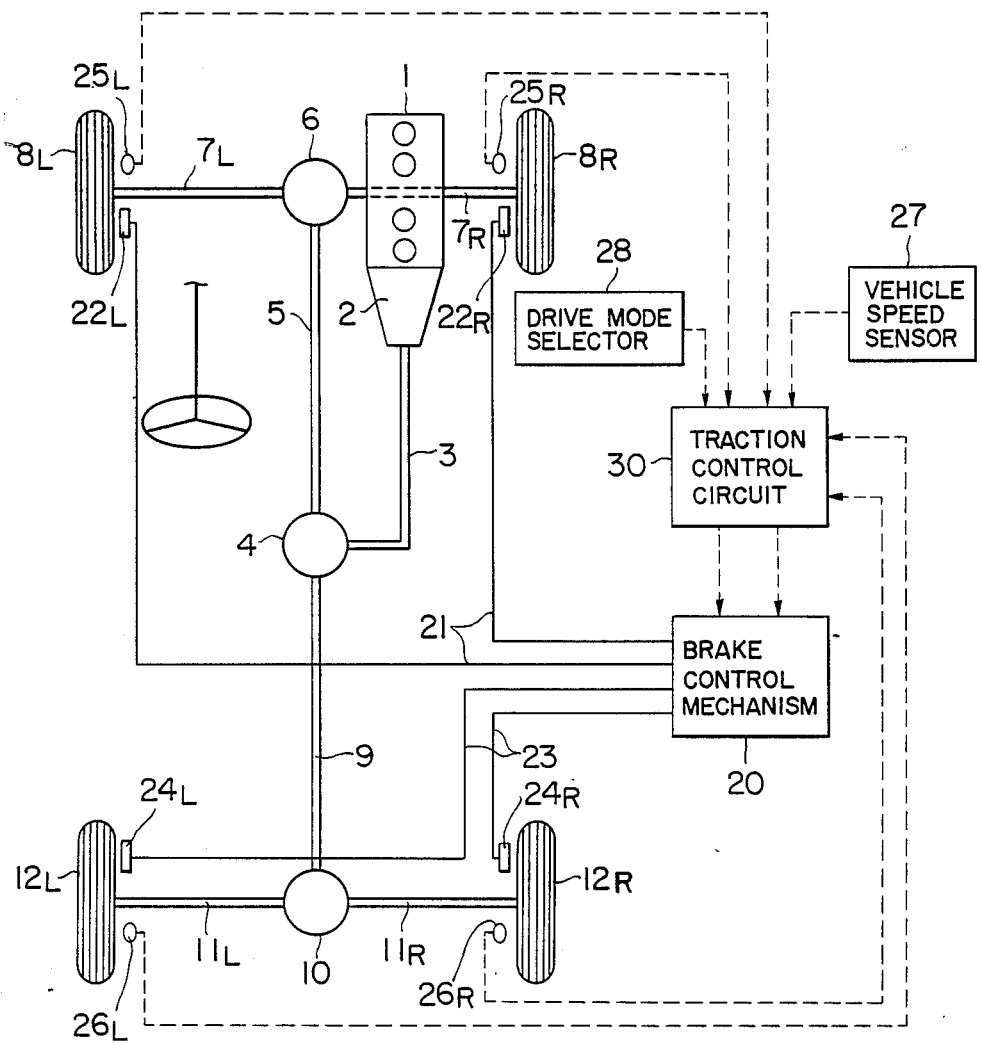
FIG. 1 is a diagrammatic representation of the traction control system of the invention as incorporated with a four wheel drive motor vehicle by way of example.

The traction control system of the invention will now be described in detail in the environment of a front engine, four wheel drive vehicle illustrated in FIG. 1. Although this illustration is very diagrammatic, it will nevertheless be seen that the vehicle comprises an internal combustion engine 1, operatively connected with a transmission 2, at the front of the vehicle. The output shaft 3 of the transmission 2 is coupled to a center differential 4. This center differential is coupled, on the one hand, to a front differential 6 via a front propeller shaft 5 and thence to a front pair of wheels 8R and 8L via front drive axles or shafts 7R and 7L. On the other hand, the center differential 4 is connected to a rear differential 10 via a rear propeller shaft 9 and thence to a rear pair of wheels 12R and 12L via rear drive axles or shafts 11R and 11L.

FIG. 1 also shows the layout of a hydraulic brake system mounted on the vehicle. The brake system is shown as being of the independent four wheel braking variety including a brake pressure control mechanism 20. This brake pressure control mechanism communicates with a front pair of brake assemblies 22R and 22L via separate brake fluid lines or conduits 21, and with a rear pair of brake assemblies 24R and 24L via separate brake fluid lines or conduits 23. The brake pressure control mechanism 20 can be of any known or suitable design capable of independently controlling the fluid pressures on the four brake assemblies 22R, 22L, 24R and 24L, and hence the braking forces on the four wheels 8R, 8L, 12R and 12L, so as to prevent wheel spin in the manner set forth hereafter.

Forming parts of the traction control system in accordance with the invention are four wheel speed sensors 25R, 25L, 26R and 26L associated with the respective vehicle wheels 8R, 8L, 12R and 12L. The wheel speed sensors generate electric signals representative of the revolving speeds of the vehicle wheels. These signals, hereinafter referred to as the wheel speed signals, are fed to an electric traction control circuit 30.

The traction control system further comprises a vehicle speed sensor 27 electrically coupled to the traction control circuit 30 for delivering thereto an electric signal, hereinafter referred to as the vehicle speed signal, indicative of the traveling speed of the vehicle. The vehicle speed sensor 27 may produce the vehicle speed signal either by integrating the output signal of an acceleration sensor mounted to the vehicle or by computing the mean value of the four wheel speeds represented by the wheel speed signals.

An additional component of the traction control system is a drive mode selector 28 which is disposed within easy reach of the vehicle driver seated on the driver's seat. The drive mode selector 28 is to be actuated manually for selecting any one of two or more different drive modes to be set forth presently. This drive mode selector is also coupled to the traction control circuit 30.

Figure 2:
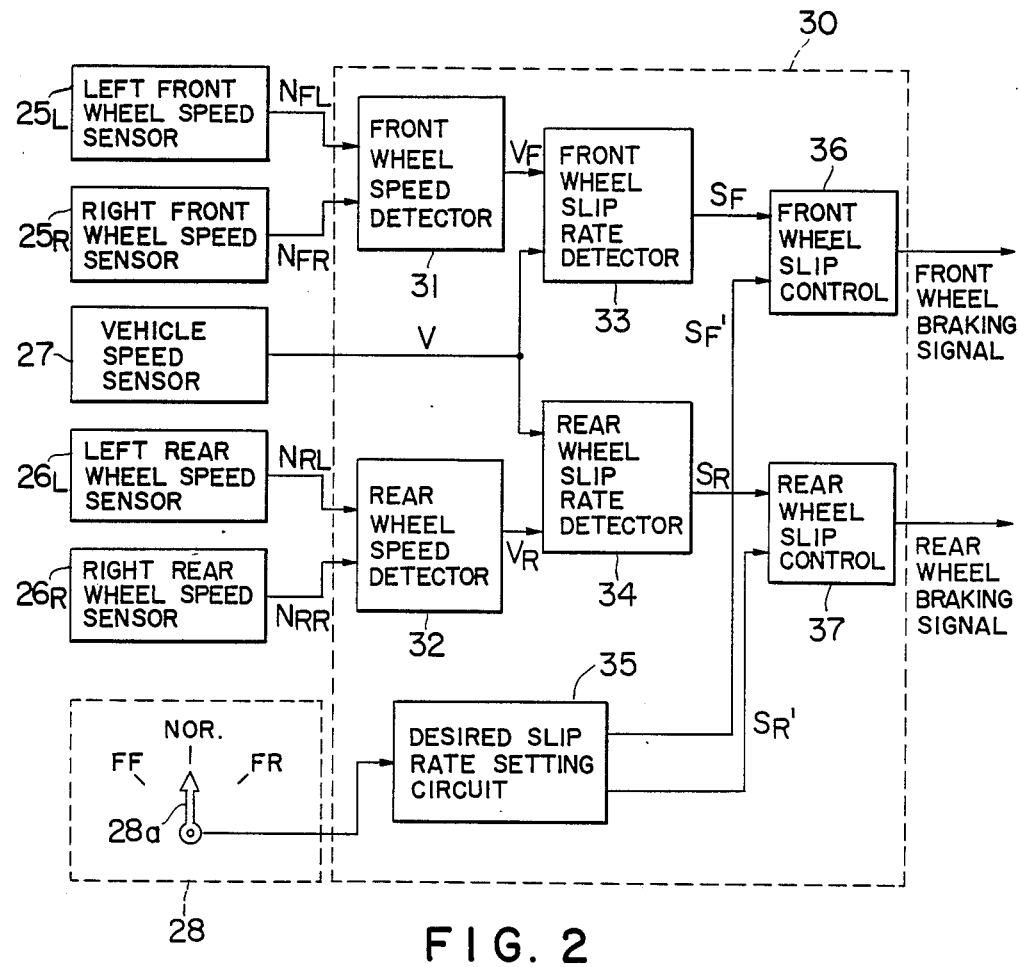
FIG. 2 is a block diagram of the electrical circuitry included in the traction control system of FIG. 1.

FIG. 2 is a block diagrammatic representation of the details of the traction control circuit 30, shown together with the four wheel speed sensors, the vehicle speed sensor and the drive mode selector. The traction control circuit 30 includes a front wheel speed detector circuit 31 and a rear wheel speed detector circuit 32. The front wheel speed detector circuit 31 is connected to the outputs of both right front wheel speed sensor 25R and left front wheel speed sensor 25L for detecting the front wheel speed VF by averaging the front right wheel speed NFR and the front left wheel speed NFL. Thus, $$VF = (NFR + NFL)/2.$$

The rear wheel speed detector circuit 32 is connected to the outputs of both rear right wheel speed sensor 26R and left rear wheel speed sensor 26L for detecting the rear wheel speed VR by averaging the rear right wheel speed NRR and the rear left wheel speed NRL.

$$VR = (NRR + NRL)/2.$$

The output of the front wheel speed detector circuit 31 is connected to a front wheel slip rate detector circuit 33, to which there is also connected the output of the vehicle speed sensor 27. The front wheel slip rate detector circuit 33 computes the actual slip rate SF of the front pair of vehicle wheels 8R and 8L from the incoming signals representative of the front wheel speed VF and the vehicle speed V.

Likewise, the output of the rear wheel speed detector circuit 32 and the output of the vehicle speed sensor 27 are both connected to a rear wheel slip rate detector circuit 34. This circuit 34 computes the actual slip rate SR of the rear pair of vehicle wheels 12R and 12L from the incoming signals representative of the rear wheel speed VR and the vehicle speed V.

As indicated also in FIG. 2, the drive mode selector 28 has a dial 28a which offers to the vehicle driver a choice among a NORMAL mode NOR, a REAR DRIVE mode FR (front engine, rear drive), and a FRONT DRIVE mode FF (front engine, front drive). The drive mode selector 28 is coupled to a desired slip rate setting circuit 35 which is included in the traction control circuit 30. The desired slip rate setting circuit 35 determines the permissible slip rate of the front and/or rear pair of vehicle wheels in accordance with the choice made at the drive mode selector 28 from among the listed three drive modes, as discussed in more detail hereafter with reference to the graph of FIG. 3.

Figure 3:
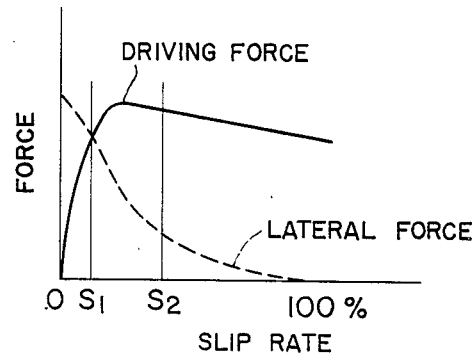
FIG. 3 is a graph useful in explaining how the permissible slip rates of the front and rear pairs of drive wheels are determined in the traction control system of FIG. 1.

When the driver chooses the NORMAL mode, the desired slip rate setting circuit 35 sets the permissible front wheel slip rate SF' and rear wheel slip rate SR' at approximately 10 percent, for example, as indicated at S1 in FIG. 3, where the propelling force and lateral force of the vehicle are equally high to assure safe driving. When the driver's choice is the REAR DRIVE mode FR, the circuit 35 sets the desired rear wheel slip rate SR' at 30-50 percent, for example, as indicated at S2 in FIG. 3, where the lateral force is much less than the propelling force. Finally, when the FRONT DRIVE mode FF is chosen, the circuit 35 sets the permissible front wheel slip rate SR' at S2.

The traction control circuit 30 further comprises a front wheel slip control circuit 36 and a rear wheel slip control circuit 37. The front wheel slip control circuit 36 is connected to the outputs of both the front wheel slip rate detector circuit 33 and the desired slip rate setting circuit 35. Thus, as these circuits 33 and 35 provide as aforesaid the signals representative of the actual and permissible slip rates of the front wheels 8R and 8L, the front wheel slip control circuit 36 produces a front wheel braking signal representative of the differential between the actual slip rate SF and permissible slip rate SF' of the front wheels. The front wheel braking signal is fed to the brake pressure control mechanism 20 for causing the same to control the fluid pressures on the front pair of wheel brakes 22R and 22L.

The rear wheel slip control circuit 37 is connected to the outputs of both the rear wheel slip rate detector circuit 34 and the desired slip rate setting circuit 35. Therefore, in response to the incoming signals indicative of the actual and permissible slip rates of the rear wheels 12R and 12L, the rear wheel slip control circuit 37 produces a rear wheel braking signal representative of the differential between the actual slip rate SR and permissible slip rate SR' of the rear wheels. The rear wheel braking signal is also directed to the brake pressure control mechanism 20 for causing the same to control the fluid pressures on the rear pair of wheel brakes 24R and 24L.

In operation, the output torque of the vehicle engine 1 is fed from the transmission 2 to the center differential 4, which transfers the driving torque to both front propeller shaft 5 and rear propeller shaft 9. The front propeller shaft 5 drives the front pair of wheels 8R and 8L via the front differential 6 and front wheel axles 7R and 7L. The rear propeller shaft 9 similarly drives the rear pair of wheels 12R and 12L via the rear differential 10 and rear wheel axles 11R and 11L. Thus the vehicle travels with all the four wheels driven from the front mounted engine 1.

During such vehicle travel the wheel speed sensors 25R, 25L, 26R and 26L deliver the four wheel speed signals NFL, NFR, NRL and NRR to the traction control circuit 30. The vehicle speed sensor 27 also delivers the vehicle speed signal V to the traction control circuit 30. The slip detector circuits 33 and 34 of the traction control circuit 30 compute the actual front wheel slip rate SF and actual rear wheel slip rate SR in response to the incoming wheel speed signals and vehicle speed signal.

Let us assume that the vehicle driver has set the drive mode selector 28 at the NORMAL mode. Then the desired slip rate setting circuit 35 will respond by delivering to both front and rear wheel slip control circuits 36 and 37 the signals SF' and SR' indicating the desired slip rate of 10 percent between the front and rear pairs of wheels. The wheel slip control circuits 36 and 37 constantly compare the actual front and rear wheel slip rates SF and SR with the permissible 10 percent slip rate.

The vehicle may be rapidly accelerated, as at the time of startup, with the traction control in the NORMAL mode. If then the slip rate of the rear wheels increases, the rear wheel slip control circuit 37 will produce the rear wheel braking signal corresponding to the resulting increase in the difference between the actual rear wheel slip rate SR and the permissible slip rate SR'. In response to this rear wheel braking signal the brake pressure control mechanism 20 will correspondingly increase the fluid pressures on the rear wheel brakes 24R and 24L. As the rotating speed of the rear wheels 12R and 12L is thus reduced, their slip rate will decrease to the permissible value SR'.

It is self evident that the front wheels 8R and 8L are similarly braked to the desired slip rate. Therefore, as the front and rear pairs of wheels are both automatically braked to the same slip rate S1 for high propelling force and high transverse force, the traction control system operates in the normal manner to prevent wheel slip, particularly when the vehicle is running on a curve. When the drive mode selector 28 is set at the REAR DRIVE mode FR, the desired slip rate setting circuit 35 will deliver to the rear wheel slip control circuit 37 the signal representative of the permissible rear wheel slip rate SR' of 30–50 percent. The rear wheel slip control circuit 37 will compare this permissible slip rate with the actual rear wheel slip rate SR represented by the output from the rear wheel slip detector circuit 34. The resulting rear wheel braking signal put out by the rear wheel slip control circuit 37 will be such that the rear wheels will be allowed to slip up to the rate of 30–50 percent as when the vehicle is making a turn with the accelerator pedal depressed. The high slip rate of the rear wheels will lend maneuverability to the vehicle. Of course, the rear wheels will be braked when their slip rate exceeds the prescribed limit, in order to prevent the instability of the vehicle.

When the vehicle driver selects the FRONT DRIVE mode, the slip rate setting circuit 35 will deliver to the front wheel slip control circuit 36 the signal representative of the permissible front wheel slip rate SF' of 30–50 percent. Then, as is apparent from the foregoing discussion of traction control in the REAR DRIVE mode, the slip rate of the front wheels will become higher to impart stability to the vehicle.

Although the traction control system of the invention have been shown and described hereinbefore as adapted for a front engine, four wheel drive vehicle, it is envisaged that the principles of the invention are applicable to vehicles having other types of drive lines including front or rear wheel drives irrespective of engine placement. It is also recognized that the drive mode selector could be so constructed as to enable a continuous change in the slip rate between the different drive modes. Additional modifications or alterations of the invention may be resorted to without departing from the scope of the invention.

What is claimed is:

1. A wheel slip responsive traction control system for a motor vehicle having front and rear wheels, brake assemblies provided on each wheel, and brake control means for individually controlling braking forces applied by the corresponding brake assemblies to the front and rear wheels, the traction control system comprising:

front wheel speed detector means for detecting a front wheel speed and for producing a front wheel speed signal;

rear wheel speed detector means for detecting a rear wheel speed and for producing a rear wheel speed signal;

vehicle speed detector means for detecting a vehicle speed and for producing a vehicle speed signal;

front wheel slip rate detector means responsive to said front wheel speed signal and said vehicle speed signal for calculating an actual front wheel slip rate and for producing an actual front wheel slip rate signal;

rear wheel slip rate detector means responsive to said rear wheel speed signal and said vehicle speed signal for calculating an actual rear wheel slip rate and for producing an actual rear wheel slip rate signal;

drive mode selector means for selecting one of a plurality of drive modes and for producing a drive mode signal;

desired slip rate setting means responsive to said drive mode signal for respectively varying desired slip rates of the front and rear wheels depending on the selected drive mode and for producing desired front and rear wheel slip rate signals;

front wheel slip control means responsive to said actual front wheel slip rate signal and said desired front wheel slip rate signal for controlling braking forces applied to the front wheels to produce an actual front wheel slip rate corresponding to said desired front wheel slip rate; and rear wheel slip control means responsive to said actual rear wheel slip rate signal and said desired rear wheel slip rate signal for controlling braking forces applied to the rear wheels to produce an actual rear wheel slip rate corresponding to said desired rear wheel slip rate.

2. A wheel slip responsive traction control system according to claim 1, wherein the motor vehicle comprises a four wheel drive system and said drive mode selector means selects one of a normal drive mode, a front drive mode, and a rear drive mode.

3. A wheel slip responsive traction control system according to claim 2, wherein said desired slip rate setting means varies said desired slip rate between a first value which generates the most suitable driving force and lateral force and a second value which is larger than the first value, and sets said desired slip rate of the front wheels to said first value in said normal and rear drive modes and to said second value in said front drive mode and sets said desired slip rate of the rear wheels to said first value in said normal and front drive mode and to said second value in the rear drive mode.

* * * * *